United States Patent [19]

Grosvenor

[11] Patent Number: 4,468,812
[45] Date of Patent: Aug. 28, 1984

[54] FLEXIBLE CONTAINER

[75] Inventor: Ronald L. Grosvenor, Perton, Nr. Wolverhampton, England

[73] Assignee: IMI Marston Limited, Wolverhampton, England

[21] Appl. No.: 458,463

[22] Filed: Jan. 17, 1983

[30] Foreign Application Priority Data

Jan. 30, 1982 [GB] United Kingdom ............... 8202724
May 12, 1982 [GB] United Kingdom ............... 8213784

[51] Int. Cl.³ .................... B65D 89/00; B65D 85/72; H05B 3/68
[52] U.S. Cl. .................... 383/108; 383/107; 383/113; 383/117; 220/461; 426/127; 426/410; 428/36; 428/61
[58] Field of Search ............... 383/107, 108, 116, 119; 220/403, 404, 460, 461; 426/124, 127, 410, 44, 415; 428/35, 61

[56] References Cited

U.S. PATENT DOCUMENTS

| | | | |
|---|---|---|---|
| 3,576,649 | 4/1971 | Brazier | 426/127 |
| 3,669,816 | 6/1972 | Smith et al. | 428/61 |
| 3,725,086 | 4/1973 | Horner | 426/410 |
| 3,919,030 | 11/1975 | Jones | 383/119 |
| 4,054,226 | 10/1977 | Bjelland et al. | 220/403 |
| 4,113,146 | 9/1978 | Williamson | 426/410 |
| 4,172,152 | 10/1979 | Carlisle | 426/415 |
| 4,230,061 | 10/1980 | Roberts et al. | 220/461 |
| 4,253,507 | 3/1981 | Williamson | 383/119 |
| 4,388,134 | 6/1983 | Long et al. | 428/61 |

Primary Examiner—William R. Dixon, Jr.
Attorney, Agent, or Firm—Cushman, Darby & Cushman

[57] ABSTRACT

A flexible container for potable liquids, the container being of a fabric reinforced rubber body with an internal lining, the lining being bonded to the rubber and being formed of a non-orientated polypropylene. The potable liquid may be wine.

10 Claims, 4 Drawing Figures

FLEXIBLE CONTAINER

BACKGROUND OF THE INVENTION

This invention relates to flexible containers of the flexitank type and has particular reference to flexible containers for potable liquids such as wine.

Flexitank type containers are used for the bulk transport of liquids. The containers conventionally comprise a fabric reinforced rubber body formed into a large pillow-like shape. The flexitank may be transported in a standard ISO container or may be transported on a flat pallet. The fabric reinforcement is relatively inextensible and provides the strength required to restrain the surging liquids in the container. The rubber prevents escape of liquid from the container.

In many cases the materials being transported are hydrocarbons or vegetable oils but recently it has been proposed to use flexitanks for the bulk transport of potable liquids, particularly wine. It will be appreciated that it is essential that the wine transported in such a flexible container should not become contaminated either by bacteria or by chemical compounds in the rubber tank material. Hitherto linered tanks have been provided principally to prevent the escape of liquid such as hydrocarbons from the tank. There are some passing references to the prevention of contamination of liquids in flexible containers but these have not, in the main, been put into practical operation.

Thus in British Patent Specification No. 988,807 there is described a flexible container provided with a liner of a barrier material to prevent contamination of foodstuff products. The external layer proposed is neoprene and the inner layer is normally a thermoweldable film such as polyvinyl chloride, polyethylene or a polyamide. Materials such as polythene and Teflon (a polytetrafluoroethylene) have to be stuck to a natural or synthetic rubber latex which can then be adhered to the external layer by pressure sensitive adhesive.

In British Patent Specification No. 983,240 there is described a flexible tank which is particularly intended for use in the transport of hydrocarbons. The principal objective is to prevent the diffusion of a thin stream of hydrocarbons escaping from the tank with a consequent risk of fire or explosion during long-term storage. The solution proposed is to use an internal film of a polyamide having a thickness of approximately 40 microns on the inside of the tank.

In British Patent Specification No. 805,106 there is described the use of polyethylene as a linear material, which polyethylene is vulcanised to an unreinforced butyl rubber layer. The combined composite of polyethylene and butyl rubber is then formed into a shape by stretching and afterwards an external rubberised fabric cover is provided which is bonded to the vulcanised rubber layer.

As far as is known such devices are not practically usable for the transport of potable liquids, particularly wine which is subject to a bacteria attack. It is found that when transporting wine in prior art type containers contamination of subsequent loads of wine can occur after the first load has been shipped and emptied. It will be appreciated that the flexible tank is normally used to transport wine from one country to another or for the transport of wine for large distances in one country, and after transporting one load the flexible tank will be cleaned, rolled up and re-used again, either later in the same season or in the following year. It has been found that wine transported subsequently in once-used tanks can become contaminated in the absence of the provisions of the present invention.

SUMMARY OF THE INVENTION

By the present invention there is provided a flexible container for a potable liquid comprising a fabric reinforced rubber body having a lining of a non-oriented polypropylene bonded to the fabric reinforced body.

Preferably the fabric reinforcing the rubber body is a non-wick fabric.

The fabric preferably has warp threads and weft threads, the threads being filled with rubber, the arrangement being such that there are no longitudinal empty passages along and between the strands of the threads.

The polypropylene is preferably bonded to an uncured fabric reinforced rubber layer and may be bonded by being calandered with the layer and thus being bonded to the rubber as the rubber is cured.

The polypropylene layer may be treated to enhance bonding. The treatment may comprise an electric discharge treatment. The non-orientated polypropylene may be a cast polypropylene.

On the inside of joints between strips of material in the tank there may be provided a tape having a liner layer of polypropylene and a supporting layer of a rubber which is not reinforced with a fabric.

BRIEF DESCRIPTION OF THE DRAWINGS

By way of example embodiments of the present invention will now be described with reference to the accompanying drawings, of which.

DESCRIPTION OF THE PREFERRED EMBODIMENTS

Figure 1:
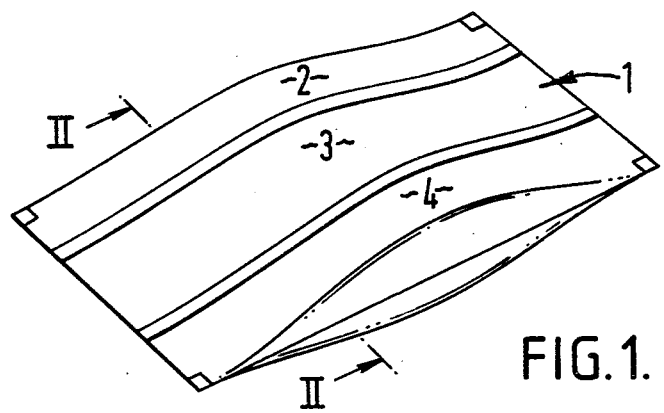
FIG. 1 is a perspective view of a flexible container.

Illustrated in FIG. 1 is a fabric reinforced flexible tank indicated generally by 1. The tank is intended for use in ISO containers and would typically be 2 m wide by 10 m long. The tank is formed essentially of a body of fabric reinforced butyl rubber which has a bonded lining of a polypropylene film. The tanks are conventionally formed from strips of material which may be manufactured in the way illustrated in FIG. 1 from a series of parallel strips 2, 3, 4 or may be formed by spirally winding a strip to form a tube and then closing the ends of the tube in a suitable manner.

Figure 2:
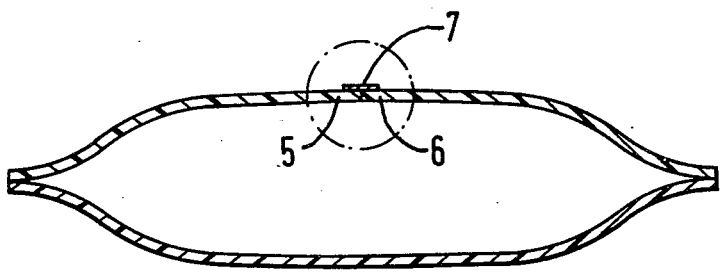
FIG. 2 is a cross-sectional view along the line II—II of FIG. 1.

Referring to FIG. 2 this shows the junction between ends 5 and 6 of two adjacent layers of material. It can be seen that the ends 5 and 6 form a butt joint and a strap 7 covers the butt joint and is bonded to the edges 5 and 6 by glueing or by a suitable solvent treatment. This is more clearly seen in FIG. 3. To manufacture the tank a layer of cast, unorientated polypropylene film is treated by an electric discharge treatment (in one method the sheet is earthed and passed beneath a high voltage wire) and is then applied to an uncured fabric reinforced butyl layer. Preferably the fabric is of the non-wicking type, ie of a design such that the threads forming the warp and weft of the fabric are filled wih rubber, there being no empty longitudinal passages along and between the filaments of the thread. The assembly is then calandered, ie rolled together and cured whereby the polypropylene film is firmly bonded to the rubber. Subsequently the tank is manufactured from the strips and, as can be seen clearly in FIG. 3, the polypropylene layers 8 and 9 butt against one another thereby minimising contact between the interior of the tank and the butyl rubber layers 5 and 6.

The strap 7 is bonded to the edges 5 and 6 by suitable glueing or solvent treatment.

It has been found that such a tank is suitable for the transport of wine which can become contaminated by the solvents found in fabric reinforced butyl rubber. The use of the preferred non-wicking fabric means that no wine travels along the cores of the threads in the fabric and thus bacterial build-up in the body of the tank resulting from decay of stagnant wine is minimised.

Figure 3:
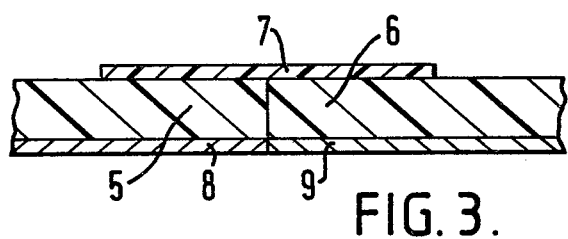
FIG. 3 is an enlarged view of the circled portion of FIG. 2.
Figure 4:
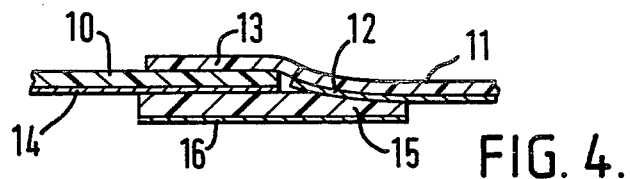
FIG. 4 is a cross-section of an alternative form of joint.

In FIG. 4 there is shown an alternative form of joint to that illustrated in FIG. 3. Instead of using a butt joint the two ends 10 and 11 are joined by an overlapping and reinforced joint. The polypropylene layer 12 on the end 11 is removed as is shown clearly in the drawing. This permits the tag portion 13 to be bonded to the upper layer of the end 10. The polypropylene layer 14 extends close to the end of the layer 12. The bonding between the tag portion 13 and the end 10 is very strong. Beneath the joint on the inside of the joint there is provided a further polypropylene line strip 15 which presents the polypropylene liner 16 to the liquid in the tank. The portion 15 has no fabric in it, being an unreinforced butyl layer. Because there are no fabric strands in the butyl material no wicking of liquid can occur into the joint.

By "non-orientated" as is used herein is meant that the plastics material should not be significantly orientated, ie it should not be in a state of internal stress. It has now been discovered that if orientated material is used, the flexing of the container which can occur on transport can give rise to cracks in the bonded inner liner, which cracks travel along the direction of orientation. However, it has been discovered that by using non-orientated material the fine cracks which may be formed in the lining material do not spread and the lining material does not tend to lift away from the reinforced fabric body.

It will be appreciated that flexible containers of the flexitank type, when used to transport liquids, are subjected to surging when the containers are accelerated. This acceleration occurs normally in transport, both during starting of the vehicle, transporting the container and also during stopping, manoeuvring or vibration of the vehicle. Because the fabric reinforced rubber tends to stretch somewhat during this movement it has been found that cracks can be developed in the lining material due to differential resistance to spreading. Non-orientated lining materials have been found to be more resistant to cracking, to cracks spreading and to lift-off.

Orientated material has an extensibility of only about 10% to 50% in tensile tests, whereas non-orientated material has an extensibility of 300% to 500%, ie it is much more ductile.

The combination of non-orientated lining material and a non-wicking fabric tends to ensure that no wine can get into the material of the tank and any wine which comes into contact with the butyl rubber as opposed to the polypropylene lining does not wick into the tank. It will be appreciated that wicking is the action of a liquid passing along a fabric by surface tension between the strands of the fabric and the liquid. With the particular design of non-fabric reinforced liner plate or tape over the joints again the possibility of wicking of the wine into the material of the tank is reduced. By such an arrangement the tank can be thoroughly cleaned after use and stored in the clean condition without wine being present. Such wine, if present, could well become contaminated by bacteria and subsequently contaminate the second or additional load of wine transported.

The tanks described above have been found suitable for the transport of both red, white and rosé wine and the polypropylene barrier prevents the solvents coming out of the butyl rubber contaminating the wine and making in undrinkable.

I claim:

1. A flexible container for a potable liquid comprising a fabric reinforced rubber body having a lining of a non-orientated polypropylene bonded to the fabric reinforced body.

2. A flexible container as claimed in claim 1 in which the fabric reinforcing the rubber body is a non-wick fabric.

3. A flexible container as claimed in claim 2 in which the fabric has warp threads and weft threads, the threads being filled with rubber, the arrangement being such that there are no longitudinal empty passages along and between the strands of the threads.

4. A flexible container as claimed in claim 1 in which the polypropylene is bonded to an uncured fabric reinforced rubber layer.

5. A flexible container as claimed in claim 4 in which the polypropylene is bonded by being calandered with the layer and being bonded to the rubber as the rubber is cured.

6. A flexible container as claimed in claim 1 in which the polypropylene layer is treated to enhance bonding.

7. A flexible container as claimed in claim 6 in which the treatment comprises an electric discharge treatment.

8. A flexible container as claimed in claim 1 in which the non-orientated polypropylene is a cast polypropylene.

9. A flexible container as claimed in claim 2 in which the container is formed of one or more strips of material, or is provided at one or more ends with joints between adjacent portions of lined fabric reinforced rubber material, wherein the improvement comprises a tape having a liner layer of polypropylene and a layer of rubber between the liner layer and the joint, the rubber being bonded to the inside of the joint and being free of fabric reinforcing threads.

10. A flexible container as claimed in claim 1 in which the rubber is butyl rubber.

* * * * *